3,311,647
PROCESS OF PREPARING ORGANOMETALLIC
ISOCYANATES
Walter A. Stamm, Tarrytown, N.Y., assignor to Stauffer
Chemical Company, New York, N.Y., a corporation
of Delaware
No Drawing. Filed Oct. 4, 1963, Ser. No. 313,773
7 Claims. (Cl. 260—429.7)

This application is a continuation-in-part of Ser. No. 269,888, now abandoned.

This invention relates to organometallic compounds. In particular the invention is concerned with a new and novel process of preparing organometallic isocyanates.

In my copending application filed on Apr. 2, 1963, S.N. 269,888 is described a new and novel synthesis for the preparation of organotin isocyanates and isothiocyanates by reacting an organotin oxide with urea or thiourea. It has now been discovered that the aforesaid synthesis is capable of being extended and enlarged whereby it becomes possible to obtain other organometallic isocyanates and isothiocyanates some of which have not previously been known or described.

As pointed out in the above referred to copending application, it is known in the organotin art that bis(trialkyltin) oxides undergo cleavage when treated with compounds having active hydrogen, e.g. acids, phenols, enols, imides, amides, and the like. In these reactions, which are commonly carried out by heating the reactants together, an alkyltin moiety becomes bonded to the acidic component by replacement of the acidic hydrogen while water is eliminated as a by-product.

With a view to preparing additional organotin derivatives by means of the above described procedure, I heated a mixture of bis(tributyltin) oxide and urea, the object being to obtain a tributyltin urea wherein one of the hydrogens in the urea molecule would be replaced by a tributyltin residue. The reaction did not, however, lead to the expected N-tributyltin urea. There was obtained instead a colorless liquid boiling in the vicinity of 110° C./0.4 mm. Subsequent chemical and instrumental analysis of this material established its structure to be tributyltin isocyanate. Although the reaction was carried out several times employing a variety of organotin oxides including trialkyltin oxides and hydroxides, there was always formed in each instance the trialkyltin isocyanate rather than the expected organotin urea. I have also ascertained that urea can be replaced by its sulfur analog, i.e., thiourea, in which case there is produced a trialkyltin isothiocyanate. The by-products of these reactions are water and ammonia.

Nor is the process of the invention limited to the preparation of organotin isocyanates, it having been discovered that other organometallic intermediates are susceptible to the new synthesis, which in some cases gives rise to compounds not previously described. For instance such organic derivatives of antimony and arsenic as exemplified by trialkylantimony and triarylantimony chlorides, hydroxides and oxides react with urea and thiourea with concomitant production of a new class of organometallic isocyanates and isothiocyanates. The chemical configuration of these hitherto unknown chemical entities can be represented by the following formula:

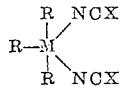

wherein R designates a hydrocarbon radical such as an alkyl radical of from 1 to 18 carbon atoms including both straight and branched configurations, e.g. ethyl, methyl, isopropyl, sec.-butyl, n-butyl, n-pentyl, n-hexyl, 2-heptyl, 3-heptyl, 1-octyl, 5-nonyl, 1-nonyl, 1-decyl, 1-dodecyl, 1-tridecyl, 1-tetradecyl, 3-tetradecyl, 1-pentadecyl, 1-hexadecyl, 1-heptadecyl, 2-octadecyl, etc., an aromatic hydrocarbon radical such as phenyl or naphthyl and an aralkyl radical such as benzyl or phenethyl and M designates arsenic or antimony.

In preparing the organometallic isocyanates and isothiocyanates of the present invention it has been determined that generally excellent results ensue by heating the components together in the presence of an inert atmosphere, such as nitrogen, at a temperature sufficient to bring about the reaction. A convenient procedure consists in fusing a mixture of the organometallic intermediate and urea or thiourea, the quantity of reactants being maintained in approximately molar proportions. Where the organometallic component is an oxide the quantity of urea or thiourea is 2 moles; on the other hand where the organometallic derivative is a hydroxide or chloride, then one mole of urea or thiourea suffices per OH— or Cl— moiety. The course of the reaction is schematically depicted by the following chemical equations:

(1) $(R)_3SnOSn(R)_3 + 2CX(NH_2)_2 \rightarrow$
$\qquad 2(R)_3SnNCX + H_2O + 2NH_3$ (2) $(R)_3SnOH + CX(NH_2)_2 \rightarrow$
$\qquad (R)_3SnNCX + H_2O + NH_3$ (3) $(R)_3SnCl + CX(NH_2)_2 \rightarrow$
$\qquad (R)_3SnNCX + HCl + NH_3$ (4) $(R)_3M=O + 2CX(NH_2)_2 \rightarrow$
$\qquad (R)_3M(NCX)_2 + H_2O + 2NH_3$ (5) $(R)_3M(OH)_2 + 2CX(NH_2)_2 \rightarrow$
$\qquad (R)_3M(NCX)_2 + 2H_2O + 2NH_3$ (6) $(R)_3MCl_2 + 2CX(NH_2)_2 \rightarrow$
$\qquad (R)_3M(NCX)_2 + 2HCl + 2NH_3$ As a preferred embodiment in practicing the invention it has been found that superior results are achieved by fusing the reactants at a temperature range of 130 to 140° C. in the case of the isocyanates and at 170 to 180° C. in the case of the isothiocyanates. Normally the reaction is carried out until the evolution of ammonia gas has ceased. In some instances it is desirable to maintain the reactants in a fused state even after the expulsion of ammonia to insure complete removal of volatile by-products. The isocyanate or isothiocyanate is then isolated from the reaction mixture by distillation in vacuo or by extraction with organic solvents or by employing other techniques familiar to the skilled practitioner in the chemical arts.

Although the new and novel process as contemplated herein was discovered as a result of heating a bis(trialkyltin) oxide with urea, it is to be pointed out, however, that a dialkyltin oxide also undergoes condensation with a urea component. In the latter instance the organotin isocyanate is obtained as a polymeric complex, the polymeric units of which appear to be a complex of the dialkyltin oxide with a dialkyltin isocyanate. Whereas the monomeric trialkyltin isocyanates and isothiocyanates can be distilled in vacuo, the complex organotin isocyanates derived from urea and dialkyltin oxides are wax-like solids having a relatively high melting range. Based on chemical and instrumental analysis the chemical constitution of these polymeric organotin isocyanate complexes is believed to be represented by the following formula:

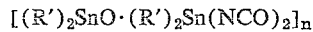

whenein R' designates an alkyl radical of from 1 to 18 carbon atoms and $n$ is an integer always greater than 2. It is to be noted that generally higher temperatures usually in the neighborhood of 170–180° C. are required in forming the dialkyltin oxide·dialkyltin diisocyanate complexes.

Reference is now made to the following examples which are inserted for the purpose of illustrating the invention. It is to be pointed out, however, that different modifications in practicing the invention will be evident to those skilled in the art without departing from the spirit or scope of said invention.

EXAMPLE 1

*Tri-n-butyltin isocyanate*

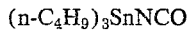
$(n-C_4H_9)_3SnNCO$

A reactor equipped with stirrer, thermometer, nitrogen gas inlet tube, vent pipe and oil heating system was charged with 600 g. (1 mole) of bis(tributyltin) oxide and 125 g. (2.05 moles) of finely powered, dry urea. The agitated slurry was slowly heated up to 125° C., at which point the evolution of ammonia commenced. The reaction mixture was kept at 140° C. for one hour during which time a gentle stream of $N_2$ was led through the reaction mixture in order to displace water and ammonia. After one hour, gas evolution ceased.

The residual colorless liquid was purified by vacuum distillation. Pure tri-n-butyltin isocyanate distilled at 110–115° C./0.4–0.5 mm. Hg. It was obtained as colorless liquid in 82% yield (540 g.); $n_D^{22}$ 1.490.

EXAMPLE 2

*Tri-iso-butyltin isocyanate*

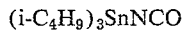
$(i-C_4H_9)_3SnNCO$

Dried, powdered urea, 12.2 g. (0.2 mole) was combined with 60 g. (0.1 mole) of bis(triisobutyltin) oxide, and while being agitated the mixture was heated to 140° C. After approximately one hour, all the urea had dissolved and gas evolution had ceased. The batch was kept at 140° C. for one additional hour after which the reaction product was distilled from the reactor at reduced pressure: Colorless liquid, B.P. 102° C./0.3 mm. Hg; $n_D^{21}$ 1.488. Yield: 52 g. (78%). Elemental and infrared analysis confirmed the structure.

EXAMPLE 3

*Triethyltin isocyanate*

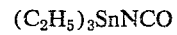
$(C_2H_5)_3SnNCO$

One mole of triethyltin hydroxide was thoroughly mixed with two moles of urea and the mixture heated for 2 hours at 135° C. At the end of this period, the pressure was reduced and triethyltin isocyanate was collected at 70° C./0.4 mm. in 91% yield. The product crystallized in the receiver; M.P. 34° C. The infrared spectrum showed a very strong band at 2190 cm.$^{-1}$ and also the elemental analysis confirmed the proposed structure.

EXAMPLE 4

$[(C_4H_9)_2SnO\cdot(C_4H_9)_2Sn(NCO)_2]_n$ 25.0 g. (0.1 mole) of insoluble, powdered dibutyltin oxide were blended with 6.1 g. (0.1 mole) of dry, powdered urea. The mixture was slowly heated to 175° C., at which point it melted to form a clear, viscous oil (dibutyltin oxide does not melt below 320° C.). The mixture was kept at 180° C. for one hour during which time ammonia and ammonium carbonate were collected in a Dry Ice trap.

The reaction product is a wax-like solid having a melting range from 190–210° C.; it is soluble in alcohols. The infrared spectrum showed a very strong band at 2180 cm.$^{-1}$. Tin and nitrogen analysis confirmed the composition of the dibutyltin oxide isocyanate as above depicted.

EXAMPLE 5

*Tri-n-butyltin isothiocyanate*

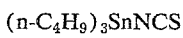
$(n-C_4H_9)_3SnNCS$

Anhydrous, finely powdered thiourea, 7.65 g. (0.1 mole) was mixed with 30 g. (0.1 mole) of bis(tributyltin) oxide and heated with agitation to 170° C. at which point fusion occurred. The reaction was kept at this temperature for one hour. Then the bath was brought to 175–185° C., high vacuum applied, and the reaction product distilled overhead through a 20 inch column at 120–130° C./0.15 mm. The yield amounted to about 50%; 17 g. About 12 g. of unreacted bis(tributyltin) oxide was recovered boiling at 140–150° C./0.15 mm. Tri-n-butyltin isothiocyanate is a clear, colorless liquid, $n_D^{22}$ 1.519. Its structure was confirmed by elemental and infrared analysis.

EXAMPLE 6

*Triisobutylantimony diisocyanate*

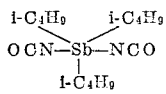

36.0 g. (0.1 mole) of triisobutylantimony dichloride and 12.0 g. (0.2 mole) of urea were heated for 2 hours at 140° C. after which the evolution of ammonia and water vapor had ceased. The so formed triisobutylantimony diisocyanate was isolated from the reaction mixture by distillation in vacuo. The analysis of the product both instrumental and chemical was in conformity with the above depicted formula.

EXAMPLE 7

*Triphenylarsenic diisocyanate*

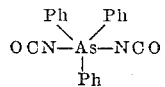

A mixture of 32.0 g. (0.1 mole) of tripheylarsenic oxide (M.P. 194°) and 12 g. (0.2 mole) of urea was gradually heated to a temperature of 135° C. at which point the reactants had formed a clear melt. The reaction mixture was held at a temperature of 130–135° C. for a period of 4 hours and then allowed to cool to room temperature. The product was isolated in the form of a glassy solid which on subjection to analysis both chemical and instrumental was shown to be represented by the above given formula.

EXAMPLE 8

*Tri-n-butyltin isocyanate*

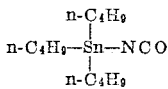

A mixture of 32.5 g. (0.1 mole) of tri-n-butyltin chloride and 6.7 g. (0.11 mole) of finely powdered, dry urea was heated at 150° C. for 2 hours. Ammonium chloride sublimed and collected on a cooled adapter while the reactants underwent liquefaction. The resulting mixture was liberated from minor amounts of solids, mostly ammonium chloride, by filtration and purified by fractional distillation in vacuo.

EXAMPLE 9

*Tri-n-butylantimony diisocyanate*

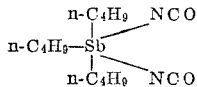

A 3-neck 100-ml. reaction flask was equipped with a thermometer, mechanical stirrer and a short, thermally insulated connection tube leading into a Dry Ice trap and through a trap cooled by liquid nitrogen to a vacuum pickup. In the reaction flask were mixed 31 g. (0.1 mole) of liquid tri-n-butylantimony oxide and 12 g. (0.2 mole) of dry, finely powdered urea. The mixture was slowly heated up to 130° C., at which point gas evolution commenced. Expulsion of the gas (a mixture of ammonia and water vapor) was facilitated by carefully applying a vacuum of about 50 mm. Hg. The agitated mixture was kept between 130–140° C. for about 30 minutes after which the foaming had ceased. The resulting clear oil was then distilled from the reactor at reduced pressure; B.P. 122° C./0.2 mm. The infrared spectrum and the elemental analysis conformed to the assigned structure.

The organometallic isocyanates are useful chemical entities exhibiting utility in many commercial applications. For instance, the trialkyltin isocyanates have been found to be excellent catalysts for use in the production of polyurethane foams from diisocyanates, glycols or glycolethers, and water. They also possess biocidal activity and in this connection mention is made of their use as foliar and soil fungicides, pre- and post-emergence herbicides and insecticides.

I claim:

1. The method of preparing an organometallic isocyanate selected from the group consisting of:

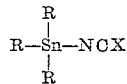

and

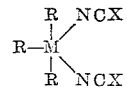

wherein R is a hydrocarbon radical selected from the class consisting of alkyl of from 1 to 18 carbon atoms, phenyl and naphthyl, X is a chalcogen selected from the class consisting of oxygen and sulfur, M is an element selected from the class consisting of antimony and arsenic, which comprises heating $XC(NH_2)_2$ wherein X has the significance as above defined with a member from the class consisting of a trisubstituted organic tin chloride, a trisubstituted organic tin hydroxide, a bis(trisubstituted) organic tin oxide, a trisubstituted organoantimony dichloride, a trisubstituted organoantimony dihydroxide, a trisubstituted organoantimony oxide, trisubstituted organoarsenic dichloride, trisubstituted organoarsenic dihydroxide and a trisubstituted organoarsenic oxide, it being understood that the substituents, have the value as above given for R and isolating the so-formed organometallic isocyanate.

2. The method according to claim 1 wherein the heating is carried out at fusion temperature.

3. The method according to claim 1 wherein the organometallic isocyanate is isolated by distillation.

4. The method according to claim 1 wherein the organometallic isocyanate is isolated as a residue after vaporizing off volatile by-products.

5. The method of preparing an organotin oxide·organotin isocyanate polymeric complex which comprises heating one molar quantity of a dialkyltin oxide having from 1 to 18 carbon atoms with one to two molar quantities of urea at a temperature at least in excess of the melting point of the urea.

6. The method according to claim 5 wherein the dialkyltin oxide and urea are employed in equimolar quantities.

7. The method according to claim 5 wherein the organotin oxide·organotin isocyanate polymeric complex is isolated as a residue after vaporizing off volatile by-products.

References Cited by the Examiner

UNITED STATES PATENTS 3,113,146  12/1963  Fielding et al. _____ 260—429.7

FOREIGN PATENTS 891,861  3/1962  Great Britain.

OTHER REFERENCES

Anderson et al.: J. Organic Chem., vol. 19, No. 8, August 1954, pages 1300–1305.

TOBIAS E. LEVOW, *Primary Examiner.*

E. C. BARTLETT, W. R. BELLAMY,
*Assistant Examiners.*